United States Patent [19]

Baumann et al.

[11] Patent Number: 4,825,363
[45] Date of Patent: Apr. 25, 1989

[54] APPARATUS FOR MODIFYING MICROINSTRUCTIONS OF A MICROPROGRAMMED PROCESSOR

[75] Inventors: Burke B. Baumann, Glendale; Troy K. Wilson, Phoenix, both of Ariz.

[73] Assignee: Honeywell Inc., Minneapolis, Minn.

[21] Appl. No.: 678,536

[22] Filed: Dec. 5, 1984

[51] Int. Cl.⁴ .............................................. G06F 9/22
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,800,293 | 3/1974 | Enger et al. | 364/200 |
| 3,949,370 | 4/1976 | Reyling, Jr. et al. | 364/200 |
| 3,949,372 | 4/1976 | Brioschi | 364/200 |
| 4,037,202 | 7/1977 | Terzian | 364/200 |
| 4,075,687 | 2/1978 | Nissen et al. | 364/200 |
| 4,179,731 | 12/1979 | Yamazaki | 364/200 |
| 4,360,868 | 11/1982 | Retter | 364/200 |
| 4,399,505 | 8/1983 | Druke et al. | 364/200 |
| 4,467,415 | 8/1984 | Ogawa | 364/200 |
| 4,471,433 | 9/1984 | Matsumoto et al. | 364/200 |
| 4,519,033 | 5/1985 | Vaughn et al. | 364/200 |
| 4,521,858 | 6/1985 | Kraemer et al. | 364/200 |
| 4,551,798 | 11/1985 | Horvath | 364/200 |
| 4,631,663 | 12/1986 | Chilinski et al. | 364/200 |

OTHER PUBLICATIONS

Baer, J. L., "Computer Systems Architecture," Computer Science Press, 1980, pp. 334–346.

Primary Examiner—David L. Clark
Attorney, Agent, or Firm—A. A. Sapelli; D. J. Lenkszus; A. Medved

[57] ABSTRACT

A controller of a microprocessor includes a control store for storing microinstructions. A programmable logic array (PLA), enabled when a predetermined macroinstruction type is to be executed, translated the operand field of the macroinstruction into information bits which are used to modify the microinstruction as it is being fetched from the control store. The bits of the microinstruction which are changeable are coupled from the control store to a first input of a multiplexer. The output of the PLA is coupled to a second input of the multiplexer. A select signal for the multiplexer is generated when the predetermined instruction type is to be excuted, thereby effecting a modification of the fetched microinstruction, and yielding a modification to the basic operation of the macroinstruction.

7 Claims, 5 Drawing Sheets

| 23 | 18 | 17 | 15 | 14 | | 6 | 5 | 4 | 0 |
|---|---|---|---|---|---|---|---|---|---|
| MACRO OP-CODE | | INDEX REG | | R-FIELD | | | TEST | K-FIELD | |

| FPLA-2 | | FPLA-1 | | |
|---|---|---|---|---|
| F07 | F06 | F07 | F06 | |
| 0 | 0 | 0 | 0 | NO OPERATION |
| 0 | 0 | 0 | 1 | NO OPERATION |
| 0 | 0 | 1 | 0 | NO OPERATION |
| 0 | 0 | 1 | 1 | NO OPERATION |
| 0 | 1 | 0 | 0 | RESET TEST F/F IF I TEST IS ODD |
| 0 | 1 | 0 | 1 | RESET TEST F/F IF I TEST IS EVEN |
| 0 | 1 | 1 | 0 | RESET TEST F/F IF BIT N IS ODD |
| 0 | 1 | 1 | 1 | RESET TEST F/F IF BIT N IS EVEN |
| 1 | 0 | 0 | 0 | SET TEST F/F IF I TEST IS EVEN |
| 1 | 0 | 0 | 1 | SET TEST F/F IF I TEST IS ODD |
| 1 | 0 | 1 | 0 | SET TEST F/F IF BIT N IS EVEN |
| 1 | 0 | 1 | 1 | SET TEST F/F IF BIT N IS ODD |
| 1 | 1 | 0 | 0 | TEST EVEN FOR I |
| 1 | 1 | 0 | 1 | TEST ODD FOR I |
| 1 | 1 | 1 | 0 | TEST EVEN FOR BIT N |
| 1 | 1 | 1 | 1 | TEST ODD FOR BIT N |

| 47 | 46 45 44 43 | 42 41 40 | 39 38 37 36 35 | 34 33 32 31 30 | 29 | 28 27 26 25 24 | 23 | 22 21 | 20 19 18 | 17-8 | 7 6 | 5 4 3 2 1 0 |
|---|---|---|---|---|---|---|---|---|---|---|---|
| A-MUX | B-MUX | ALU DEST | ALU CONTROL OP MUX | FUNC #1 | N O T U S E D | FUNC #2 | W A I T | MEM | EMIT | NEXT CI ADDR 12-2 | B B I I T T | NEXT BIT 1    NEXT BIT 0 |
| 0 A | 0 MA | P M | | 00 NO FUNC | | 00 NO FUNC | | 0 NM | 0 NO EMIT | | B B | 00X OX    OX0 X0 |
| 1 B | 1 MD | C A | | 01 INDEX R | | 01 CARRY IN | | 1 WD | 1 DECODE | | I I | 20X IX    IX0 X1 |
| 2 MD | 2 KB | | | 02 OVERFLOW | | 02 RME | | 2 RD | 2 CONTROL BRANCH | | T T | 01X STAT    OX1 IOI |
| 3 PC | 3 B | B R | MOVE A 00 | 03 S TSTF | | 03 GEN3 | | 3 RI | 3 GEN1 BRANCH | | | 21X FIX    IX1 AEQUAL ALU |
| | | A R | MOVE B 25 | 13 R TSTF | | 04 MULTIPLY | | | 4 EMIT CONSTANT | | 1 0 | 02X II2    OX2 II1 |
| | | | MOVE AN 01 | 00 GEN1 | | 05 DIVIDE | | | 5 DECODEX | | | 22X NIS    IX2 CNP |
| | | | MOVE BN 13 | 25 SHIFT STEP | | 06 INJECT GI | | | 6 EMIT INDIRECT | | | 03X SIN    OX3 MA13 |
| | | | MOVEN A 01 | 07 R INT | | 07 LOCK | | | 7 EMIT LOWE INDIR | | | 23X MAI2    IX3 MA15 |
| | | | MOVEN B 13 | | | 10 LOAD FIFO | | | | | | 04X MA14    OX4 NOT U22 |
| | | | MOVEN AN 00 | | | 11 NOT USED | | | | | | 24X NOT U23    IX4 II0 |
| | | | MOVEN BN 25 | ARE SAME AS | | 12 SIS | | | | | | 05X XFZ    OX5 ALU MINUS |
| | | | TEST/TEST NOT | MOVE/MOVE NOT | | 13 NOT USED | | | | | | 25X MA8    IX5 FPR |
| | | | | | | 14 S STATUS | | | | | | 06X NP19    OX6 MA9 |
| | | | ZERO 07 | | | 15 R ALL | | | | | | 26X MA10    IX6 MA11 |
| | | | ONES TO 31 | | | 16 SHIFT CNT | | | | | | 07X NOT A23    OX7 EXT 2 |
| | | | | | | 17 TO MD | | | | | | 27X SC37    IX7 M6 |
| | | | AND A,B 27 | | | 20 S OOMF | | | | | | |
| | | | A,BN 17 | | | 21 R OOMF | | | | | | |
| | | | AN,B 05 | | | 22 MA 22 BIT | | | | | | |
| | | | AN,BN 03 | | | 23 BRCH INHIB | | | | | | |
| | | | NAND A,B 11 | | | 24 S IAI2 | | | | | | |
| | | | A,BN 21 | | | 25 RD INSTR | | | | | | |
| | | | AN,B 33 | | | 26 RMPE | | | | | | |
| | | | AN,BN 35 | | | 27 NOT USED | | | | | | |
| | | | OR A,B 02 | | | 30 ENB GEN1 | | | | | | |
| | | | A,BN 04 | | | 31 REAL K | | | | | | |
| | | | AN,B 21 | | | 32 PC UPPER | | | | | | |
| | | | AN,BN 11 | | | 33 ALT PC | | | | | | |
| | | | NOR A,B 03 | | | 34 MBCPC | | | | | | |
| | | | A,BN 05 | | | 35 NO EXT | | | | | | |
| | | | AN,B 17 | | | 36 MASK BMUX | | | | | | |
| | | | AN,BN 27 | | | 37 TXHASSIST | | | | | | |
| | | | XOR A,B 23 | | | | | | | | | |
| | | | A,BN 15 | | | | | | | | | |
| | | | AN,B 15 | | | | | | | | | |
| | | | AN,BN 23 | | | | | | | | | |
| | | | ADO A,B 22 | | | | | | | | | |
| | | | SUBTRACT 14 | | | | | | | | | |
| | | | INC +CARRY 00 | | | | | | | | | |
| | | | DEC 36 | | | | | | | | | |
| | | | DOUBLE 30 | | | | | | | | | |

Fig. 3

APPARATUS FOR MODIFYING MICROINSTRUCTIONS OF A MICROPROGRAMMED PROCESSOR

BACKGROUND OF THE INVENTION

This invention relates to a processor, and more particularly, to a control unit which generates control signals for controlling the arithmetic and logic unit, in the execution of a microinstruction currently being held in a microinstruction register.

Processors execute a variety of instructions, which can include arithmetic type instructions, shift type instructions, logical type instructions, data manipulative type instructions, . . . These instructions can be categorized as memory-to-memory instructions, memory-to-register instructions, register-to-register instructions, . . . , and as a result can be further classified as a type one instruction, type two instruction, . . . , each type of instruction having a corresponding instruction format. Various approaches currently exist for executing a macro instruction in a microprogrammable microprocessor. In one such implementation, a firmware program, or routine (i.e., group of instructions) can reside in a control store (or control memory) which stores the group of microinstructions. When the operation code (OP code) of a macro instruction is initially decoded, one of the firmware routines can be invoked and executed. For a predetermined type of macro instruction, such as the data manipulative type macro instruction, the basic operation can be common to more than one macroinstruction, for example, "TEST BIT FOR A LOGIC VALUE OF 1", or "TEST BIT FOR A LOGIC VALUE OF 0". Based on the specific instruction, a branch to the corresponding microprogram routine could be performed which would then execute the specific instruction and test the bit specified. This implementation requires several microinstructions to be executed and, requires these microinstructions to be stored in the control store.

In an effort to reduce the size of the control store and to reduce the number of instructions required to be executed in the execution of the macro instruction resulting in a faster execution time, the present invention modifies the microinstruction as it is fetched from the control store and transferred to the microinstruction register. Predetermined fields of the microinstruction are modified with predetermined fields of the macro instruction which specifies the variation of the basic OP code, thereby modifying the basic operation, decreasing the execution time of the macro instruction, and resulting in speeding up the execution time of the macro instruction.

SUMMARY OF THE INVENTION

Therefore, there is supplied by the present invention, a control unit of a microprogrammable microprocessor. The microprogrammable microprocessor, includes a controller, an arithmetic and logic unit (ALU), and associated registers, for executing each macroinstruction of a predefined macroinstruction set, each macroinstruction having an operand field and an operation code field. The controller of the present invention comprises a control store for storing a plurality of microinstructions. A translation element, having input terminals adapted to receive the operand field of the macroinstruction currently being executed, converts the information expressed by the format of the operand field of the macroinstruction into information compatible with the format of the microinstruction word, thereby outputting converted operand data utilized to modify the microinstruction word as it is being fetched from the control store. A switching element, having a first set of input terminals operatively connected to the control store to receive preselected portions of a fetched microinstruction, and further having a second set of input terminals operatively connected to the translation element to receive the converted operand data, selects between (i) the preselected portion of a fetched microinstruction word and (ii) the converted operand data, in response to a select signal, thereby outputting selected data. A register, operatively connected to the switching element to receive the selected data, and further operatively connected to the control store to receive that portion of the fetched microinstruction word which is not subject to being selected by the switching element, holds the microinstruction for current execution.

Accordingly, it is an object of the present invention to provide a control unit which modifies the microinstruction as it is being fetched from a control store.

It is another object of the present invention to provide a control unit of a microprogrammable processor which modifies the microinstruction as it is fetched from control store with predetermined fields from the macroinstruction.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 2 shows an instruction format of a data manipulative/test bit instruction of the processor of FIG. 1;

FIG. 3 shows a format of a microinstructions word of the processor of FIG. 1;

FIG. 6 shows the truth table utilized for the implementation of control logic for a test flip/flop of the controller of the preferred embodiment of the present invention.

DETAILED DESCRIPTION

Figure 1:
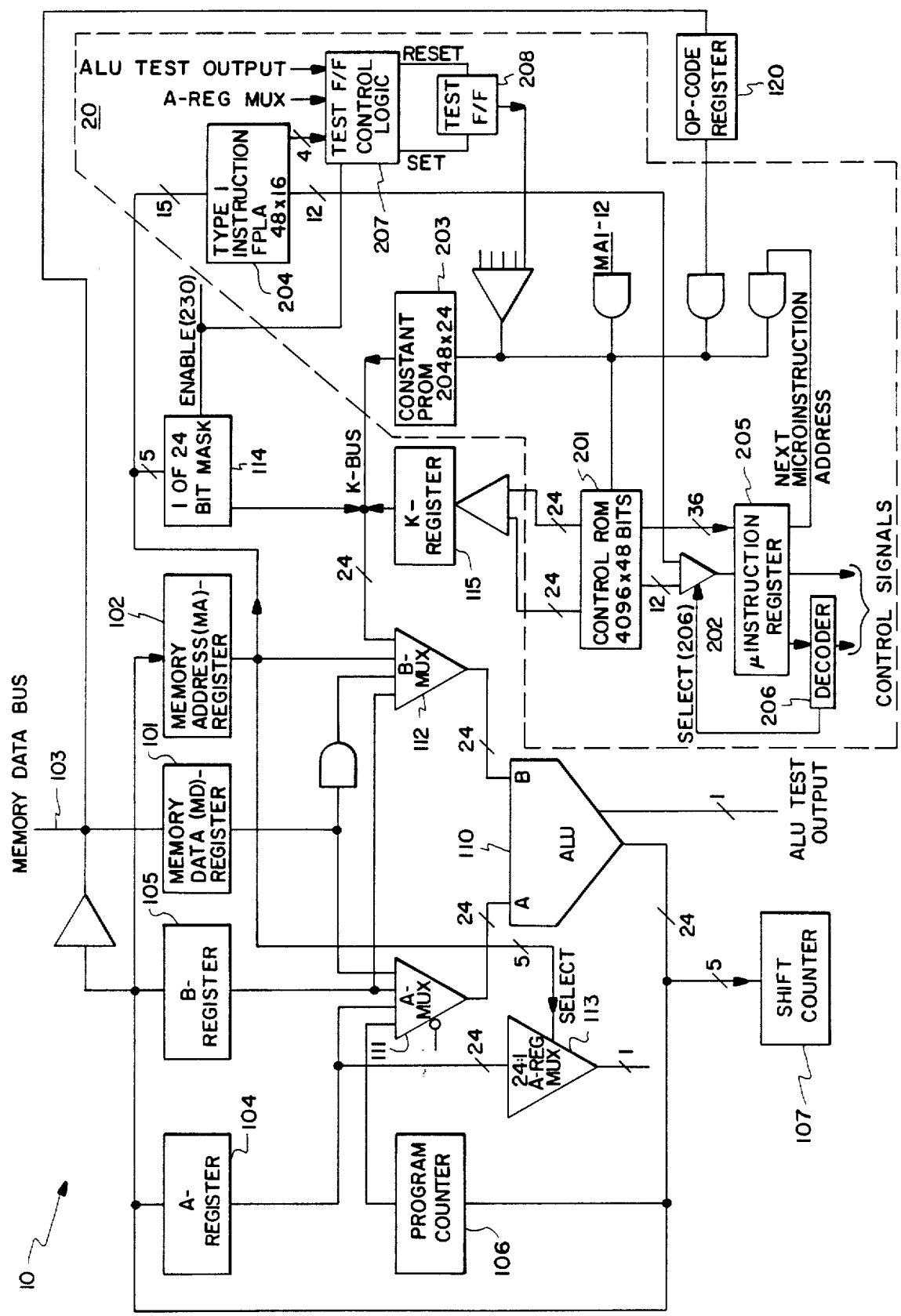
FIG. 1 shows a block diagram of a microprogrammable microprocessor which incorporates a control unit of the present invention.

Referring to FIG. 1, there is shown a block diagram of a microprogrammable microprocessor (or more simply microprocessor) 10 which can incorporate a control unit 20 of the present invention. The microprocessor 10 includes a memory data register (MD register) 101 and a memory address register (MA register) 102 which interfaces with a memory (not shown) via a memory bus 103. The microprocessor 10 of the preferred embodiment is an AQ type processor and includes an A register 104, a Q register (not shown), the Q register being a dedicated memory location, and a B register 105. A program counter 106 and a shift counter 107 are utilized in the overall control and execution of the instructions of the microprocessor 10. An ALU 110 executes the various arithmetic and logic operations under control of the control unit 20. In the preferred embodiment of the present invention, the ALU 110 is an 74F181 TTL integrated circuit chip. The A input and the B input of the ALU 110 are operatively coupled to receive the operand data from A register 104, B register 105, MD register 101, MA register 102, and data from a K-register 115 via a K bus through an A-MUX 111, and a B-MUX 112, respectively. (The numbers 24 through the lines of the A input and the B input of ALU 110 indicate the number of bits of the line utilized in the preferred embodiment of the present invention, in this case the lines being a 24 bit line. This nomenclature is included in the drawings of the present application.) Any bit in the A register 104 may be tested/manipulated through the use of a 24-to-1 A-register multiplexer (24-to-1 A-REG MUX) 113 and a 1 of 24 bit mask 114.

The control unit 20 of the preferred embodiment of the present invention includes a 48 bit wide control ROM 201 which stores the microinstructions utilized to implement the macro instruction set of the microprocessor 10. The control ROM 201 also includes as part of the microinstruction a constant which is obtained from a constant PROM 203 in the execution of some of the microinstructions. Twelve bits from the control ROM 201 are coupled to a first input of a MUX 202. A second group of 12 bits is coupled from a field programmable logic array (FPLA) 204 to a second input of the MUX 202. The 12 bit output of the MUX 202 is coupled to a microinstruction register 205, along with 36 bits from the control ROM 201. The outputs of the microinstruction register 205 in conjunction with a decoder 206 comprise the control signals which are in turn coupled to the various units, such as the ALU 110, for controlling the operation of these units. By selecting the second inputs of MUX 202 via a select signal, SELECT(206), predetermined bits of the microinstruction read from control ROM 201 can be modified thereby giving the microinstruction transmitted to the microinstruction register 205 a different (or modified) set of control indicators, yielding a modified set of control signals for a modified operation. The 12 bits of the microinstruction which are modified are in part determined from the operand field of the macroinstruction. The operand field temporarily stored in the MA register 102 is coupled to the FPLA 204 which decodes the operand data into control bits of the microinstruction. The control ROM 201 is addressed by bits 1-12 of the MA register 102, a "next instruction address" field of the microinstruction, or from an address supplied by a macro OP code register (OP-CODE register) 120.

Since the preferred embodiment of the present invention is implemented for data manipulative/bit test type instructions, a test flip-flop control logic 207 and test flip-flop 208 are included. Four bits from the FPLA 204 are coupled to the test flip-flop control logic 207 along with an ALU TEST OUTPUT signal from ALU 110 and the output signal of the 24-to-1 A-REG MUX 113.

The microprocessor 10 of the preferred embodiment of the present invention has defined five instruction types as shown in Table 1.

TABLE 1

| Type 1. | Register manipulation instructions which affect the A Register and TSTF (Test Flip-Flop). |
| Type 2 | Input/output and certain internal machine instructions. |

TABLE 1-continued

| Type 3. | A and Q Register manipulation instructions. |
| Type 4. | Full operand instructions. |
| Type 5. | Extended function (Quasi) instructions which execute programs in memory. | of particular interest here in the Type 1 instruction which utilizes the modification feature of the control unit of the present invention. Before discussing the operations required by the microprocessor 10 in the execution of the Type 1 instruction, some general discussion of the microprocessor 10 will be given.

Referring to FIG. 2, there is shown an instruction format of a Type 1 macroinstruction word. The microprocessor 10 of the preferred embodiment of the present invention utilizes a 24 bit macroinstruction word. The upper six bits (bits 18-23) are utilized for the macro OP code. For those instructions which can be indexed, bits 15-17 are utilized for specifying an index register. Bits 0-14 define an operand field. For a Type 4 macroinstruction, the operand defines the memory address of the operand data. For a Type 1 macroinstruction the R field defines a variation of the basic operation of the OP code. The test field (bit 5) defines whether a test operation is involved, and the K field (bits 0-4) specify the bit to be tested. The effective bit to be tested is a function of the K field and the index field since the K field is subject to an indexing operation.

FIG. 3 shows a format of the microinstruction word of the microprocessor 10 of the preferred embodiment of the present invention. The modification bits are supplied by the FPLA 204. Bits 35-40 and bits 8-13 of the microinstruction word are modified by the FPLA 204. Bits 35-39 of the microinstruction word are utilized for the control of the ALU 10, and bit 40 of the microinstruction word is utilized for the destination of the ALU, bit 40 specifying the A register 104. The next microinstruction address is provided by bits 6-17 of the microinstruction word.

The basic operation of the microprocessor 10 will now be discussed. During a first cycle of a microprocessor 10 an macroinstruction is fetched from the memory (not shown) and is placed into the memory data register 101. The upper six bits (bits 18-23) are also placed in the OP code register 120. These six bits comprise the basic instruction (or MACRO) OP code. As part of this first cycle, the instruction undergoes any address or instruction modification that might result from relative addressing or indexing. The result of this operation is then stored in the memory address register 102. Based on the OP code supplied by OP code register 120, the firmware routines stored in control ROM 201 execute a 64 way branch based on the contents of the OP code register 120. This vectors the firmware to the routine required to execute any one of the 64 basic OP codes of the microprocessor 10. The operations described thus far are common to the execution of all of the instructions of the microprocessor 10.

The lower 18 bits of the macroinstruction are now contained in the MA register 102. For an instruction which requires an operand data fetch from memory, the memory address is now stored in the memory address register. For a Type 1 macroinstruction the lower 15 bits of the MA register 102 are transmitted to the FPLA 204. The lower 5 bits of the MA register 102 are also used to select the input to the 24-to-1 A register multiplexer 113 and the mask to be outputted by the 1 of 24 bit mask 114. The first microinstruction specifies SELECT(206). This allows the next microinstruction that is currently being fetched to be modified by the output of the FPLA 204. The microinstruction that is being fetched and modified always specifies the A register and the K bus as sources and the B register as one of the destinations. The FPLA 204 outputs 12 bits which are substituted or used to set 12 f the bits of the microinstruction stored in microinstruction register 205. Five of the FPLA outputs are substituted for bits 35-39 of the microinstruction. These bits define the ALU operation to be performed. One FPLA output is substituted for bit 40 in the microinstruction and this bit determines if the A register will be a destination for the ALU 110 output. The five remaining output bits of the FPLA 204 are substituted for bits 8-12 of the microinstruction. These bits form part of the address of the next microinstruction and are used to vector firmware to various routines required to complete the execution of various Type 1 instructions. As a result of modifying the microinstruction fetched and transmitted to the microinstruction register 205, the ALU 10 operation will be changed to the appropriate operation. The majority of the Type 1 instructions will be completed when the modified microinstruction has completed its execution. The Type 1 instructions that have not been completed will be vectored by the modified microinstruction to an appropriate routine that will complete that specific Type 1 instruction.

Figure 4:
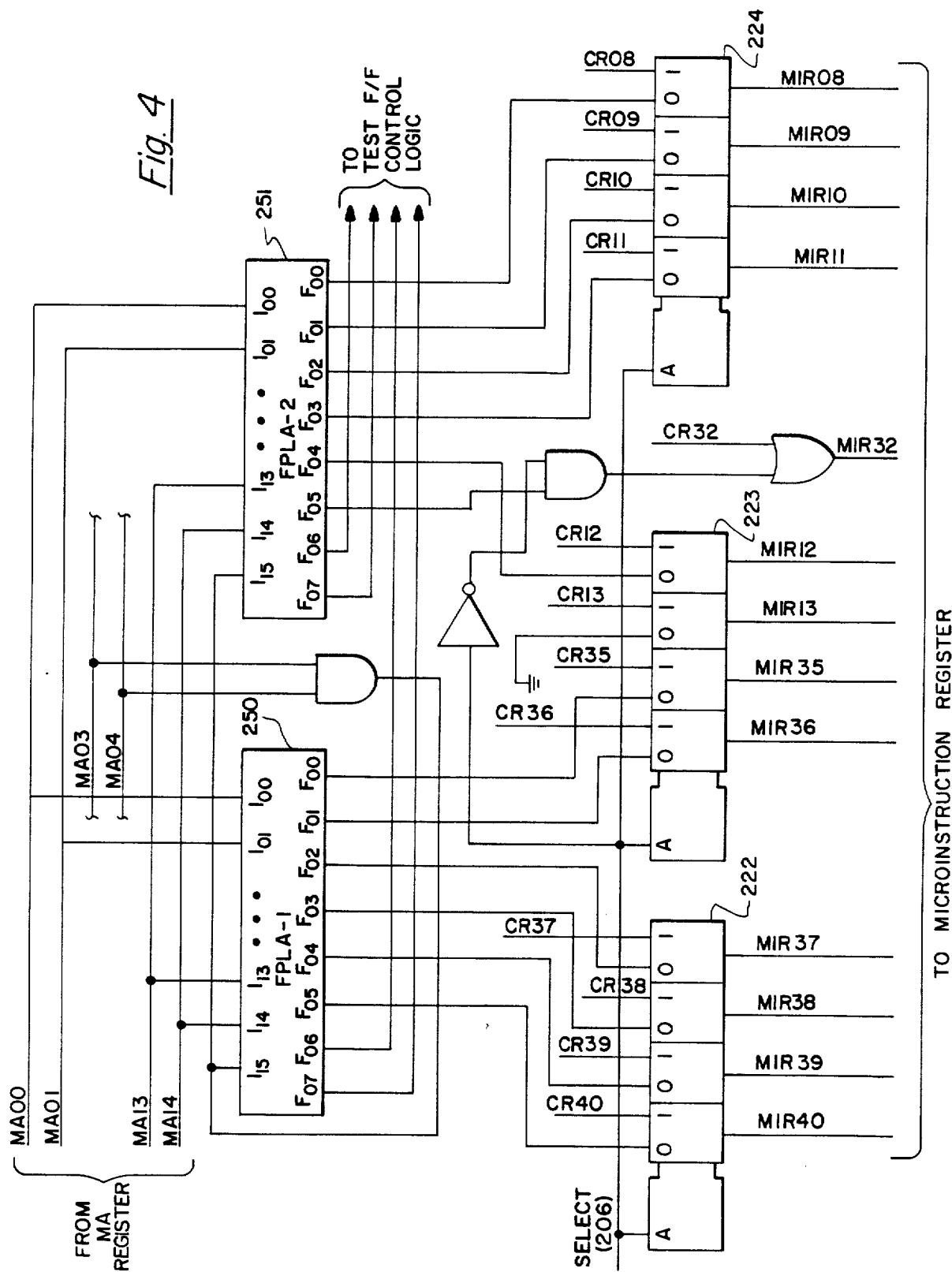
FIG. 4 shows a logic diagram of a programmable logic array of the controller of the preferred embodiment of the present invention.

Referring to FIG. 4 there is shown a logic diagram of the FPLA 204, and the MUX 202. The FPLA 204 is divided into two individual FPLAs, FPLA-1 250 and FPLA-2 251. The inputs of each FPLA 250, 251 are numbered from $I_{00}$ through $I_{15}$, each input coupled to a corresponding input bit $MA_{00}$–$MA_{14}$ from the memory address register 102, the memory address register being used to temporarily store the operand field of the Type 1 macroinstruction. $I_{15}$ of each FPLA 250, 251 is a combined input of $MA_{03}$ and $MA_{04}$. The input $I_{15}$ is utilized as a check on the K field in which a value of logic 0 indicates the value of K must be less than or equal to 23, a logic 1 indicates the K field must have a value of greater than or equal to 24, or if no value is specified K is a don't care term. The FPLAs 250, 251 can be of the type of 82S100 integrated circuit chip. The MUX 202 of the preferred embodiment of the present invention comprises three integrated circuit chips of the type F157, denoted 222, 223, 224. Each zero input of the MUX 202 is coupled to a corresponding output $F_{00}$ through $F_{05}$ of the FPLAs 250, 251 as shown. Each one input of the MUX 202 is coupled to a corresponding bit $CR_{08}$ through $CR_{13}$, and $CR_{35}$ through $CR_{40}$ of the control ROM 201 ($CR_{08}$ denoting bit 8 of the control ROM, $CR_{09}$ denoting bit 9 of the control ROM . . . ). The output of the MUX 202 is then coupled to a corresponding bit of the microinstruction register 205, MIR40 denoting bit 40 of the microinstruction register 205, MIR39 denoting bit 39 of the microinstruction register 205, . . . . Output $F_{05}$ of PLA 251 is combined with bit 32 of the next microinstruction if SELECT(206) is enabled in the current microinstruction. This operation is used to change a function of the microinstruction word to a Type 1 shift operation. Bits 0-14 of the Type 1 instruction are utilized to generate the modification bits of the microinstruction word in accordance with Tables 2 and 3. (The letter L indicates low (or a logic zero) and the letter H indicates high (or a logic one). The letter A indicates active, the preferred embodiment of the present invention utilizes active high. The dot and the dash indicate not present and don't care, respectively.)

TABLE 2

| FPLA-1 INPUT | | | | | FPLA-1 OUTPUT | | | | MACRO |
|---|---|---|---|---|---|---|---|---|---|
| M A 1 4 | M A 1 2 | M A 0 8 | M A 0 4 | M A 0 0 | F 0 7 | F 0 4 | F 0 3 | F 0 0 | OP-CODE MNE-MONIC |
| -LLL | LLLL | LLLL | LLLL | . . A . | . AAA | | | | LDZ |
| -LLL | LLLH | HLLL | LLLL | A . A . | . AAA | | | | SLZ |
| -LLL | LLLH | HHLL | LLLL | . AA . | . AAA | | | | RLZ |
| -LLL | HLLL | LHLH | HHHH | . . . A | AAAA | | | | CLO |
| -LLL | HLLL | HLLH | HHHH | . . . A | AAAA | | | | CMO |
| LHLL | HHHH | HHL- | - - - - | AAA . | AA . A | | | | TOC |
| -LLL | HLLH | LLHH | HLLL | . A . . | . . . A | | | | RNZ |
| -LLL | HLLH | LHHH | HLLL | A . . . | . . . A | | | | SNZ |
| -LLL | HLLH | HLLH | HHHH | A . . A | A . . A | | | | SET |
| HLLL | HLLH | HLH- | - - - - | AA . . | . . . A | | | | TZE/TSC |
| -LLL | HLLH | HHLH | HHHH | . A . A | A . . A | | | | RST |
| -LLL | HLLH | HHHH | HLLL | AA . . | . . . A | | | | TNZ |
| -LLH | LLLL | LLLL | LLLL | . . A . | . . . A | | | | CPL |
| -LLH | LHHL | LLLL | LLLL | . . A . | . . . A | | | | NEG |
| -HHL | LLLL | LLLL | LLLL | . . AA | A . . A | | | | LMO |
| -HHL | HLLH | HLHH | HLLL | AAA . | . . . A | | | | TZC |
| -HHH | LLLL | LHLH | HHHH | . . . . | . . . A | | | | CLZ |
| -HHH | LLLL | HLLH | HHHH | . . . . | . . . A | | | | CMZ |
| LHHH | LHLH | LHL- | - - - - | A . AA | AA . A | | | | SES |
| HHHH | LLLH | HLH- | - - - - | AA . A | AAAA | | | | TMO/TMF |
| LHHH | LLLH | HHHH | HLLL | AA . A | AAAA | | | | TNM |
| LLLL | LLLL | LLH- | - - - - | . . . A | AAAA | | | | SRL |
| LLLL | LLHL | LLL- | - - - - | . . AA | . AAA | | | | TBK |
| LLLL | LHLL | LLL- | - - - - | . . A . | . A . A | | | | ICB |
| LLLL | LHHL | LLL- | - - - - | . . AA | . A . A | | | | IDO |
| LLLL | HLLL | LLH- | - - - - | . . . A | AAAA | | | | SRC |
| LLLL | HLLH | LLL- | - - - - | . A . A | AAAA | | | | ROD |
| LLLL | HLLH | LHL- | - - - - | A . . A | AAAA | | | | SOD |
| LLLL | HLLH | HHL- | - - - - | AA . A | AAAA | | | | TOD |
| LLLL | HHHL | LLL- | - - - - | . . AA | . . . A . | | | | ADO |
| LLLH | HLLL | LLH- | - - - - | . . . A | AAAA | | | | SRA |
| LHLL | HLHL | LLL- | - - - - | . . A . | AAAA | | | | RBK |
| LHLL | HLHH | LLL- | - - - - | . AA . | AAAA | | | | ROR |
| LHLL | HLHH | LHL- | - - - - | A . A . | AAAA | | | | SOR |
| LHLL | HLHH | HLL- | - - - - | AAA . | AAAA | | | | TER |
| LHLL | HLHH | HHL- | - - - - | AAA . | AAAA | | | | TOR |
| LHLL | HHLL | LLL- | - - - - | . . AA | AA . A | | | | SBK |
| LHLL | HHLH | LLL- | - - - - | . AAA | AA . A | | | | ROS |
| LHLL | HHLH | LHL- | - - - - | A . AA | AA . A | | | | SOS |
| LHLL | HHLH | HLL- | - - - - | AAAA | AA . A | | | | TES |
| LHLL | HHLH | HHL- | - - - - | AAAA | AA . A | | | | TOS |
| LHLL | HHHL | LLL- | - - - - | . . A . | AA . A | | | | CBK |
| LHHL | LHHL | LLL- | - - - - | . . A . | A . AA | | | | LBM |
| LHHH | LLLH | LLL- | - - - - | . A . . | A . . A | | | | REV |
| LHHH | LLLH | LHL- | - - - - | A . . . | A . . A | | | | SEV |
| LHHH | LLLH | HHL- | - - - - | AA . A | AAAA | | | | TEV |
| LHHH | LLHH | LLL- | - - - - | . AA . | AAAA | | | | RER |
| LHHH | LHHH | HHL- | - - - - | AAA . | AA . A | | | | TEC |

TABLE 3

| FPLA-2 INPUT | | | | | FPLA-2 OUTPUT | | | | MACRO |
|---|---|---|---|---|---|---|---|---|---|
| M A 1 4 | M A 1 2 | M A 0 8 | M A 0 4 | M A 0 0 | F 0 7 | F 0 4 | F 0 3 | F 0 0 | OP-CODE MNE-MONIC |
| -LLL | LLLL | LLLL | LLLL | AA . . | . . . A | | | | LDZ |
| -LLL | LLLH | HLLL | LLLL | . . . . | . . . A | | | | SLZ |
| -LLL | LLLH | HHLL | LLLL | . A . . | . . . A | | | | RLZ |
| -LLL | HLLL | LHLH | HHHH | AA . . | . . A . | | | | CLO |
| -LLL | HLLL | HLLH | HHHH | AA . . | . . AA | | | | CMO |
| LHLL | HHHH | HHL- | - - - - | AA . . | . . . A | | | | TOC |
| -LLL | HLLH | LLHH | HLLL | . A . . | . . . A | | | | RZZ |
| -LLL | HLLH | LHHH | HLLL | . . . . | . . . A | | | | SNZ |
| -LLL | HLLH | HLLH | HHHH | . A . . | . . . A | | | | SET |
| HLLL | HLLH | HLH- | - - - - | . A . . | . . . A | | | | TZE/TSC |
| -LLL | HLLH | HHLH | HHHH | . . . . | . . . A | | | | RST |
| -LLL | HLLH | HHHH | HLLL | . . . . | . . . A | | | | TNZ |

TABLE 3-continued

| | | FPLA-2 INPUT | | | FPLA-2 OUTPUT | | | | MACRO OP-CODE MNE-MONIC |
|---|---|---|---|---|---|---|---|---|---|
| M A 1 4 | M A 1 2 | M A 0 8 | M A 0 4 | M A 0 0 | F 0 7 | F 0 4 | F 0 3 | F 0 0 | |
| -LLH | LLLL | LLLL | LLLL | AA.. | | | ...A | | CPL |
| -LLH | LHHL | LLLL | LLLL | AA.. | | .A.. | | | NEG |
| -HHL | LLLL | LLLL | LLLL | AA.. | | | ...A | | LMO |
| -HHL | HLLH | HLHH | HLLL | .A.. | | | ...A | | TZC |
| -HHH | LLLL | LHLH | HHHH | AA.. | | ...A. | | | CLZ |
| -HHH | LLLL | HLLH | HHHH | AA... | | | ..AA | | CMZ |
| LHHH | LHLH | LHL- | ---- | A... | | | ...A | | SES |
| HHHH | LLLL | HLH- | ---- | .A.. | | | ...A | | TMO/TMF |
| LHHH | LLLH | HHHH | HLLL | .... | | | ...A | | TNM |
| LLLL | LLLL | LLH- | ---- | AAA. | | | ...A | | SRL |
| LLLL | LLHL | LLL- | ---- | AA.. | | | ...A | | TBK |
| LLLL | LHLL | LLL- | ---- | AA.. | | | ...A | | ICB |
| LLLL | LHHL | LLL- | ---- | AA.. | | | ...A | | IDO |
| LLLL | HLLL | LLH- | ---- | AAA. | | | ...A | | SRC |
| LLLL | HLLH | LLL- | ---- | A... | | | ...A | | ROD |
| LLLL | HLLH | LHL- | ---- | AA.. | | | ...A | | SOD |
| LLLL | HLLH | HHL- | ---- | AA.. | | | ...A | | TOD |
| LLLL | HHHL | LLL- | ---- | AA.. | | | ...A | | ADO |
| LLLH | HLLL | LLH- | ---- | AAA. | | | ...A | | SRA |
| LHLL | HLHL | LLL- | ---- | AA.. | | | ...A | | RBK |
| LHLL | HLHH | LLL- | ---- | A... | | | ...A | | ROR |
| LHLL | HLHH | LHL- | ---- | AA.. | | | ...A | | SOR |
| LHLL | HLHH | HLL- | ---- | A... | | | ...A | | TER |
| LHLL | HLHH | HHL- | ---- | AA.. | | | ...A | | TOR |
| LHLL | HHLL | LLL- | ---- | AA.. | | | ...A | | SBK |
| LHLL | HHLH | LLL- | ---- | A... | | | ...A | | ROS |
| LHLL | HHLH | LHL- | ---- | AA.. | | | ...A | | SOS |
| LHLL | HHLH | HLL- | ---- | A... | | | ...A | | TES |
| LHLL | HHLH | HHL- | ---- | AA.. | | | ...A | | TOS |
| LHLL | HHHL | LLL- | ---- | AA.. | | | ...A | | CBK |
| LHHL | LHHL | LLL- | ---- | AA.. | | | ...A | | LBM |
| LHHH | LLLH | LLL- | ---- | AA.. | | | ...A | | REV |
| LHHH | LLLH | LHL- | ---- | A... | | | ...A | | SEV |
| LHHH | LLLH | HHL- | ---- | A... | | | ...A | | TEV |
| LHHH | LLHH | LLL- | ---- | AA.. | | | ...A | | RER |
| LHHH | LHHH | HHL- | ---- | A... | | | ...A | | TEC |

Figure 5:
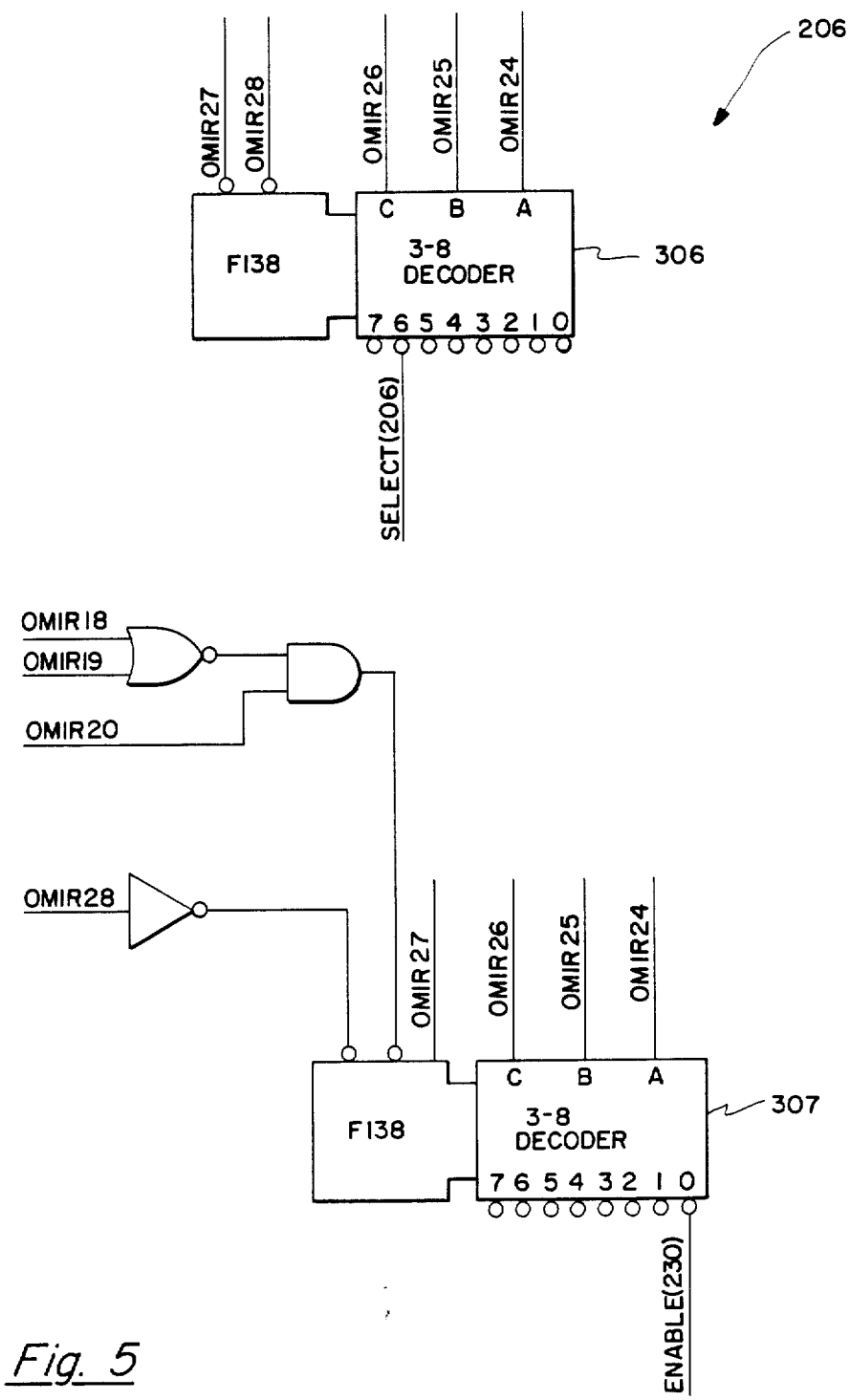
FIG. 5 shows a partial logic diagram of a decoder of the controller of the preferred embodiment of the present invention.

Referring to FIG. 5 there is shown a partial logic diagram of the decoder 206. The decoder 206 comprises a plurality of decoder integrated circuit chips. A first 3-to-8 decoder 306 has coupled to the inputs the outputs of the microinstruction register 205, the output of the microinstruction register 205 being denoted OMIRXX where XX denotes the bit of the microinstruction register. A second 3-to-8 decoder 307 is utilized to generate the ENABLE(230) signal, the second decoder decoding the output bits from the microinstruction register 205 as shown. The first and second decoders 306, 307 are of the type F138 integrated circuit chip.

The control ROM 201 is of the type AMD AM 27S191, and the microinstruction register 205 is of the type 74F175 integrated circuit chip. The test flip flop control logic 207 is implemented in accordance with the truth table of FIG. 6, from the output signals $F_6$ and $F_7$ from the FPLAs 250, 251. The data manipulation and bit testing instructions implemented in the microprocessor 10 of the preferred embodiment of the present invention are listed in the Appendix along with a brief description of the function performed by the instruction.

While there has been shown what is considered to be the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

APPENDIX

CBK - CHANGE BIT K

CBK complements bit Z of the A-Register. All other bits of A remain unchanged.

CL0 - COUNT LEAST SIGNIFICANT ONES

CL0 counts the number of "one" bits to the right of the rightmost "zero" bit in the A Register. The count value is placed into the J Counter. If A equals $77777777_8$, the count is $24_{10}$.

CLZ - COUNT LEAST SIGNIFICANT ZEROS

CLZ counts the number of "zero" bits to the right of the rightmost "one" bit in the A Register. The count value is placed into the J Counter. If A equals $00000000_8$, the count is $24_{10}$.

CM0 - COUNT MOST SIGNIFICANT ONES

CM0 counts the number of "one" bits to the left of the leftmost "zero" bit in the A Register. The count value is placed into the J Counter. If A equals $77777777_8$, the count is $24_{10}$.

CMZ - COUNT MOST SIGNIFICANT ZEROS

CMZ counts the number of "zero" bits to the left of the leftmost "one" bit in the A Register. The count value is placed into the J Counter. If A equals $00000000_8$, the count is $24_{10}$.

CPL - COMPLEMENT A

CPL replaces the contents of the A Register with its ones complement.

CTO - COUNT TOTAL ONE

CTO counts the total number of "one" bits in the A-Register. The count value is placed into the J-Counter. If A equals $77777777_8$, the count is $24_{10}$.

CTZ - COUNT TOTAL ZEROS

CTZ counts the total number of "Zero bits" in the A-Register. The count value is placed into the J-Counter. If A equals $00000000_8$, the count is $24_{10}$.

IBK - ISOLATE BIT K

IBK leaves a designated bit of the A Register unchanged and sets all the other bits to "zero".

ICB - ISOLATE AND COMPLEMENT BIT K

ICB complements Bit K of the A-Register and sets all of the other bits to "zero".

LD0 - LOAD ONE INTO BIT K

LD0 places a "one" into bit Z of the A Register. All other bits are reset to "zero".

LDZ - LOAD ZEROS INTO A

LDZ replaces the contents of the A Register with "zeros".

LM0 - LOAD MINUS ONE

LM0 places a "one" into each of the bits of the A-Register.

NEG - NEGATE

NEG replaces the contents of the A Register with its 2's complement.

RBK - RESET BIT K

RBK places a "zero" into bit Z of the A Register. All other bits remain unchanged.

RER - RESET TSTF IF BIT K IS EVEN AND RESET BIT K

RER resets the test Flip-Flop (TSTF) if Bit Z of the A-Register is "Zero". If the Bit Z is "one", the TSTF remains unchanged. Bit Z of the A-Register is set to "Zero".

REV - RESET TSTF IF BIT K IS EVEN

REV resets the Test Flip Flop (TSTF) if bit Z of the A-Register is "zero". If the bit is "one" the TSTF remains unchanged.

RLZ - RESET TSTF AND LOAD ZEROS INTO A

RLZ replaces the contents of the A-Register

APPENDIX -continued with "zeros". The test Flip Flop is also reset to a "Zero".

RNZ - RESET TSTF IF A IS NON-ZERO
RNZ resets the Test Flip-Flop (TSTF) if any bit in the A Register is a "one". Otherwise TSTF is unchanged.

RØD - RESET TSTF IF BIT K IS ODD
RØD resets the Test Flip-Flop (TSTF) if bit Z of the A Register is "one". If the bit is "zero" the TSTF remains unchanged.

ROR - RESET TSTF IF BIT K IS ODD AND RESET BIT K
ROR resets the Test Flip-Flop (TSTF) if bit Z of the A-Register is "one". If the bit is "zero", the TSTF remains unchanged. Bit Z of the A--Register is set to "zero".

ROS - RESETS TSTF IF BIT K IS ODD AND SET BIT K
ROS resets the test Flip-Flop (TSTF) if bit Z of the A-Register is "one". If the bit is "Zero", the TSTF remains unchanged. Bit Z of the A-Register is set to "one".

RST - RESET TSTF
RST resets the Test Flip Flop (TSTF) to a "zero".

SBK - SET BIT K
SBK sets bit Z of the A Register to one. All other bits remain unchanged.

SET - SET TSTF
SET sets the Test Flip-Flop (TSTF) to a "one".

SLZ - SET TSTF AND LOAD ZEROS INTO A
SLZ replaces the contents of the A-Register with "Zeros". The TSTF is set to a "one".

SNZ - SET TSTF IF A IS NON-ZERO
SNZ sets the Test Flip-Flop (TSTF) if any bit of the A Register is a "one". Otherwise TSTF remains unchanged.

SØD - SET TSTF IF BIT K IS ODD
SØD sets the Test Flip Flop (TSTF) if bit Z of the A Register is "one". If the bit is "zero", TSTF remains unchanged.

SOR - SETS TSTF IF BIT K IS ODD AND RESET BIT K
SOR sets the test Flip-Flop (TSTF) if bit Z of the A-Register is a "one". If the bit is a "Zero", the TSTF remains unchanged. Bit Z of the A-Register is set to "Zero".

SOS - SET TSTF IF BIT K IS ODD AND SET BIT K
SOS sets the test Flip-Flop (TSTF) if bit Z of the A-Register is a "one". If the bit is a "Zero", the TSTF remains unchanged. Bit Z of the A-Register is set to a "one".

SRA - SHIFT RIGHT ARITHMETIC
SRA shifts the contents of the A Register Z places to the right. The sign bit is not changed. Bits shifted out of $A_0$ are lost. Bits shifted into $A_{22}$ are the same as the sign bit.

SRC - SHIFT RIGHT CIRCULAR
SRC shifts A Register bits to the right, out of $A_0$ and into $A_{23}$.

SRL - SHIFT RIGHT LOGICAL
SRL shifts all twenty-four bits of the A Register to the right Z places. Bits shifted out of $A_0$ are lost. Zeros shift into $A_{23}$.

TEC - TEST EVEN AND COMPLEMENT BIT K
TEC sets the Test Flip-Flop (TSTF) if bit Z of the A-Register was "zero", if the bit was a "one", the TSTF is reset. Bit Z of the A-Register is then complemented.

TER - TEST EVEN AND RESET BIT K
TER examines bit Z of the A Register. If the bit is zero, the TSTF is set to a one; the TSTF is reset to a zero if the bit is one. TER then resets bit Z to a zero.

TES - TEST EVEN AND SET BIT K
TES examines bit Z of the A Register. If the bit is zero, the TSTF is set to a one; the TSTF is reset to a zero if the bit is one. TES then sets Z to a one.

TEV - TEST BIT K EVEN
TEV sets the Test Flip-Flop (TSTF) if bit Z of the A Register is "zero". If the bit is "one" the TSTF is reset.

TMF - TEST MINUS ONE FOR K BITS
TMF shifts the contents of the A-Register right circular Z places. If all Z bits shifted into $A_{23}$ are "ones", the test Flip-Flop is set, otherwise it is reset.

TMO - TEST MINUS ONE
TMO sets the Test Flip-Flop (TSTF) if the A-Register bits are all "one". It resets TSTF if any bit in the A-Register is a "Zero".

TNM - TEST NOT MINUS ONE
TNM sets the TSTF if any bit in the A-Register is a zero. When all bits in the A-Register are "ones", TSTF is reset.

TNZ - TEST A NON-ZERO
TNZ sets the Test Flip-Flop (TSTF) if any bit in the A Register is a "one". It resets the TSTF if the A Register bits are all "zero".

TØD - TEST BIT K ODD
TØD sets the Test Flip-Flop (TSTF) if bit Z of the A Register is "one". If the bit is "zero" TD resets the TSTF.

TOR - TEST ODD AND RESET BIT K
TOR sets the TSTF if bit Z is a "one" and resets the TSTF if bit Z is a "zero". After the testing operation bit Z is set to a zero. That is, TOR replaces the following two instruction sequence: TOD K
    RBK K

TOS - TEST ODD AND SET BIT K
TOS examines bit Z of the A Register. If Z equals one, the TSTF is set to a one; the TSTF is reset to zero if Z equals zero. TOS then sets bit Z a one.

TSC - TEST AND SHIFT CIRCULAR
TSC shifts the contents of the A Register right circular Z places. If all Z bits shifted into $A_{23}$ are "zero", the Test Flip-Flop is set; otherwise it is reset.

TZC - TEST ZERO AND COMPLEMENT
TZC sets the TSTF when all bits in the A Register are "zero". If any bit in the A Register is a "one", the TSTF is reset. TZC then replaces the contents of the A Register by its 1's complement.

TZE - TEST A ZERO
TZE sets the Test Flip Flop (TSTF) if the A Register bits are all "zero". It resets TSTF if any bit in the A Register is a "one".

Note: Z is a function of K and X.

We claim:

1. A micprogrammable microprocessor for executing macroinstructions, each macroinstruction including an operation code field of binary signals and an operand field of binary signals, said microprocessor including:
   arithmetic and logic unit (ALU) means for executing arithmetic and logic operations;
   first register means for storing a macroinstruction in execution by the microprocessor:
   first control storage means for storing microinstructions at addressable locations, said first control storage means responsive to address signals being applied thereto for producing as an output a microinstruction stored at the addressed location, each microinstruction including a set of "n" binary signals, each microinstruction further including a subset of "b" binary signals, where "n" and "b" are integers greater than 0, and "n" is greater than "b", each microinstruction also including signals representing the address of the next microinstruction to be executed by the microprocessor:

circuit means for applying addresses signals to the first control storage means;

programmable logic array means for producing as a first output "b" binary signals which are a function of the binary signals applied thereto:

circuit means for applying to the programmable logic array means binary signals of the operand field of the macroinstruction stored in the first register means;

multiplexer means responsive to a select signal for producing as its output, one of two sets of "b" input signals applied thereto:

circuit means for applying the first output of the programmable logic array means as one set of "b" input signal and the subset of "b" binary signals of a microinstruction produced by the control storage means as a second set of input signals to the multiplexer means:

microinstruction register means for storing a microinstruction;

circuit means for applying the subset of "b" signals produced by the multiplexer means and the binary signals of the microinstruction produced by the control storage means less said subset of "b" binary signals of the microinstruction for storage in the microinstruction register means, the signals stored in the microinstruction register means being the microinstruction in execution at any given time;

decoder means to which selected signals of the microinstruction stored in the microinstruction register means are applied for producing a binary select signal;

circuit means for applying the select signal produced by the decoder means to the multiplexer means, said select signal determining whether the subset of "b" binary signals of the microinstruction produced by the control store is stored in the microinstruction register, or the "b" bits binary signals produced by the programmable logic array means is stored in the microinstruction register means;

test flip flop means for storing the results of the execution of a test microinstruction and for producing an output signal representing such result;

test flip flop control logic means for controlling the state of the test flip flop means responsive to a second output of "c" binary signals produced by the programmable array logic means where "c" is an integer greater than zero, a binary signal stored in a designated position of a second register means, and an ALU test output binary signal produced by the ALU means;

circuit means for applying the second output of the programmable array logic means, the binary signal from the second register means and the ALU test output signal to the test flip flop logic means; and circuit means for applying the output signal of the test flip flop as an address signal applied to the first control storage means.

2. The microprogrammable microprocessor of claim 1 which further comprises a second control storage means for storing constants at addressable locations, said second control storage means responsive to address signals being applied thereto for producing as its output a constant stored at the addressed location, circuit means for applying address signals from a micro-opcode register means or the mmicroinstruction register means to the second control store, and circuit means for applying the output of the second control storage means to the ALU means.

3. The microprogrammable microprocessor of claim 2 in which the first and second control store means are read only memories.

4. The microprogrammable microprocessor of claim 3 in which n equals 48, b equals 12, and c equals 4.

5. A micro programmable microprocessor for executing macroinstructions, said microprocessor comprising:
   a. arithmetic and logic unit (ALU) means for executing arithmetic and logic operations;
   b. first register means for storing binary signals of a macroinstruction in execution;
   c. second register means for storing binary signals of a microinstruction in execution,
   d. control storage means for storing binary signals of microinstructions at addressable locations and, for outputting the binary signals of a microinstruction stored at the addressed location in response to address signals, each microinstruction being a set of "n" binary signals in which there is a first subset of "b" binary signals, where "n" and "b" are integers greater than zero, and "n" is greater than "b";
   e. first circuit means, connected to said first register means and responsive to binary signals of the macroinstruction stored in the first register means being applied thereto, for producing a second subset of "b" binary signals;
   f. multiplexer mean, connected to said first circuit means and to said control store means, for selectively outputting said second subset of "b" binary signals or said first subset of "b" binary signals, respectively, in response to a decoded control signal from said second register means, thereby modifying the microinstruction outputted from the control storage means, the modified microinstruction being received by the second register means, the modified microinstruction yielding a modified set of control signals for a modified operation by said ALU means;
   g. second circuit means, connected to said first register means, to said second register means, and to said first circuit means, and further connected to said control storage means, for determining a next microinstruction address, the next microinstruction address being the address signal received by said control storage means.

6. A microprogrammable microprocessor as defined in claim 5 in which signals of the subset of "b" signals form at least a part of the address of the next microinstruction to be produced by the control storage means.

7. A microprogrammable microprocessor as defined in claim 6 in which signals of the subset of "b" signals further include signals determining the operation to be performed by the ALU in executing the microinstruction stored in the second register means.

* * * * *